United States Patent  [15] 3,672,205
Leidenfrost  [45] June 27, 1972

[54] DETERMINATION OF HEAT TRANSFER THROUGH FLUIDS

[72] Inventor: Wolfgang Leidenfrost, West Lafayette, Ind.

[73] Assignee: The United States of America as represented by the Secretary of the Air Force

[22] Filed: Dec. 14, 1970

[21] Appl. No.: 97,597

[52] U.S. Cl. .......................................... 73/15 A, 324/61 R
[51] Int. Cl. ................................................... G01n 25/18
[58] Field of Search ........................................ 73/15; 324/61

[56] References Cited

UNITED STATES PATENTS 2,654,862  10/1953  Petersen ................................. 324/30
2,475,138  7/1949  Hood, Jr. et al. ......................... 73/15
3,279,239  10/1966  Arends et al. ............................ 73/15

*Primary Examiner*—Richard C. Queisser
*Assistant Examiner*—Herbert Goldstein
*Attorney*—Harry A. Herbert, Jr. and Cedric H. Kuhn

[57] ABSTRACT

A method is provided for determining the heat transfer properties of a fluid which comprises filling the space between two concentric geometrically similar objects with the fluid to be tested, the objects being in a state of thermal equilibrium; changing the temperature of the outer of the two concentric bodies; measuring the capacitance between the bodies as the temperature of the outer body changes; and measuring the time required for the capacitance measurement to reach a constant value, thereby indicating that the two bodies are in a new state of thermal equilibrium. One of the most important uses of the method is in controlling the quality of industrial products produced by continuous processes.

10 Claims, 5 Drawing Figures

INVENTOR.
WOLFGANG LEIDENFROST
BY Harry A. Herbert Jr
Cedric H. Kuhn and
ATTORNEYS

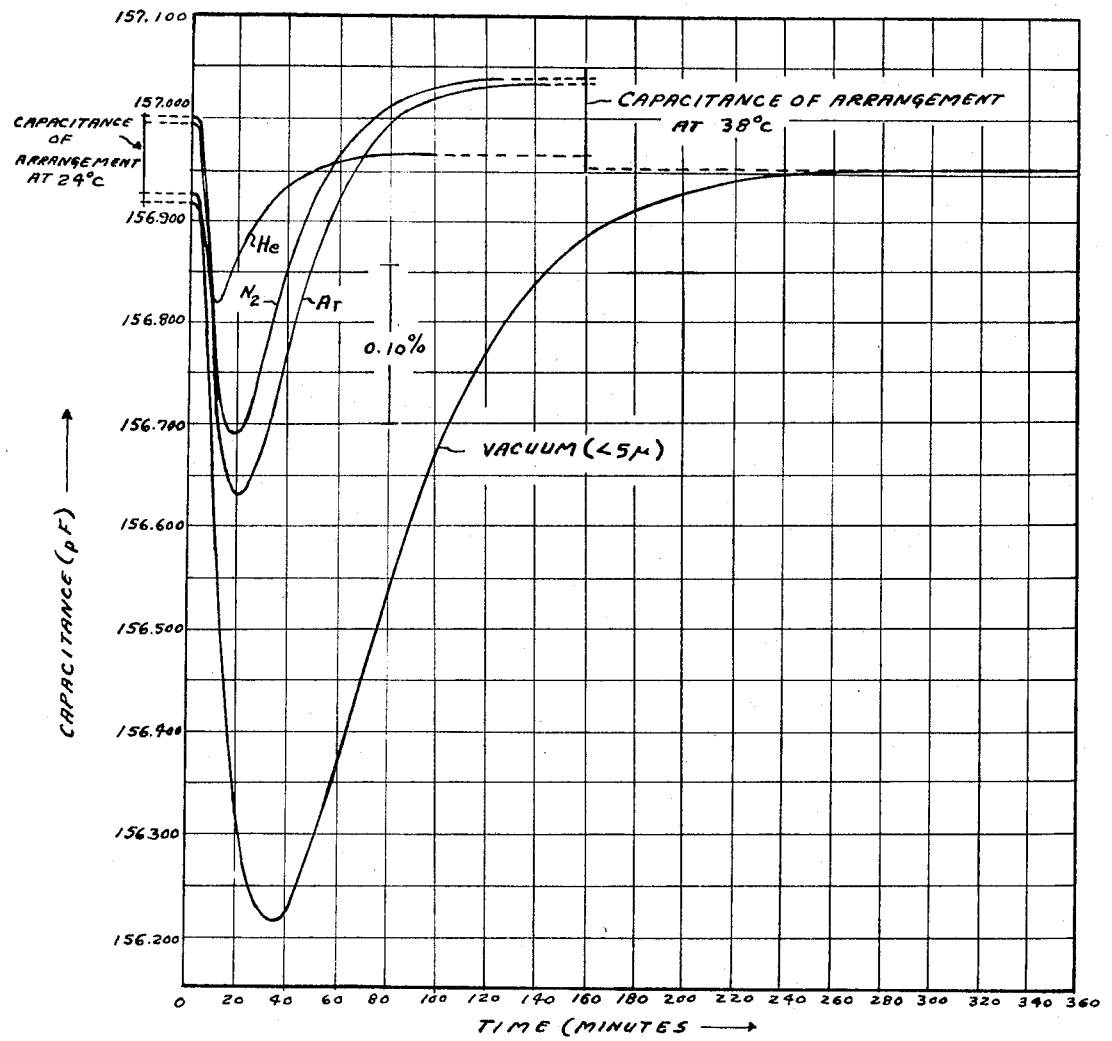

DETERMINATION OF HEAT TRANSFER THROUGH FLUIDS

FIELD OF THE INVENTION

This invention relates to a method and apparatus for determining the heat transfer properties of a fluid without the necessity of making temperature measurements. In one aspect the invention relates to a method for controlling the quality of industrial products produced by continuous processes.

BACKGROUND OF THE INVENTION

Heat transfer evaluation of fluids generally requires a knowledge of the surface temperature of one or more solid bodies. The measurement of surface temperature cannot be precisely accomplished because the sensory elements cannot be made a part of the surface. The elements are either attached to the surface or positioned in holes drilled into the heat exchanging wall near the surface. These procedures have the disadvantage of disturbing the temperature field at the measurement locations. Not only does the surface become unisothermal, but its true temperature outside the location of disturbance cannot be established precisely from the observed values. Thus, heat transfer processes which are a function of surface temperature are indeterminable or at best inaccurate.

It is an object of this invention, therefore, to provide a method of determining the heat transfer through a fluid that eliminates the measurement of surface temperatures.

Another object of the invention is to provide an apparatus which enables the heat transfer properties of a fluid to be determined without measuring surface temperatures.

Still another object of the invention is to provide a method of controlling the quality of products produced in a continuous process.

A further object of the invention is to provide a method for identifying fluids of unknown composition.

Other objects and advantages of the invention will become apparent to those skilled in the art upon consideration of the accompanying disclosure and the drawing, in which:

FIG. 5 is a series of graphs showing measured values of capacitance as functions of time for four different fluids and under a vacuum.

SUMMARY OF THE INVENTION

Figure 1:
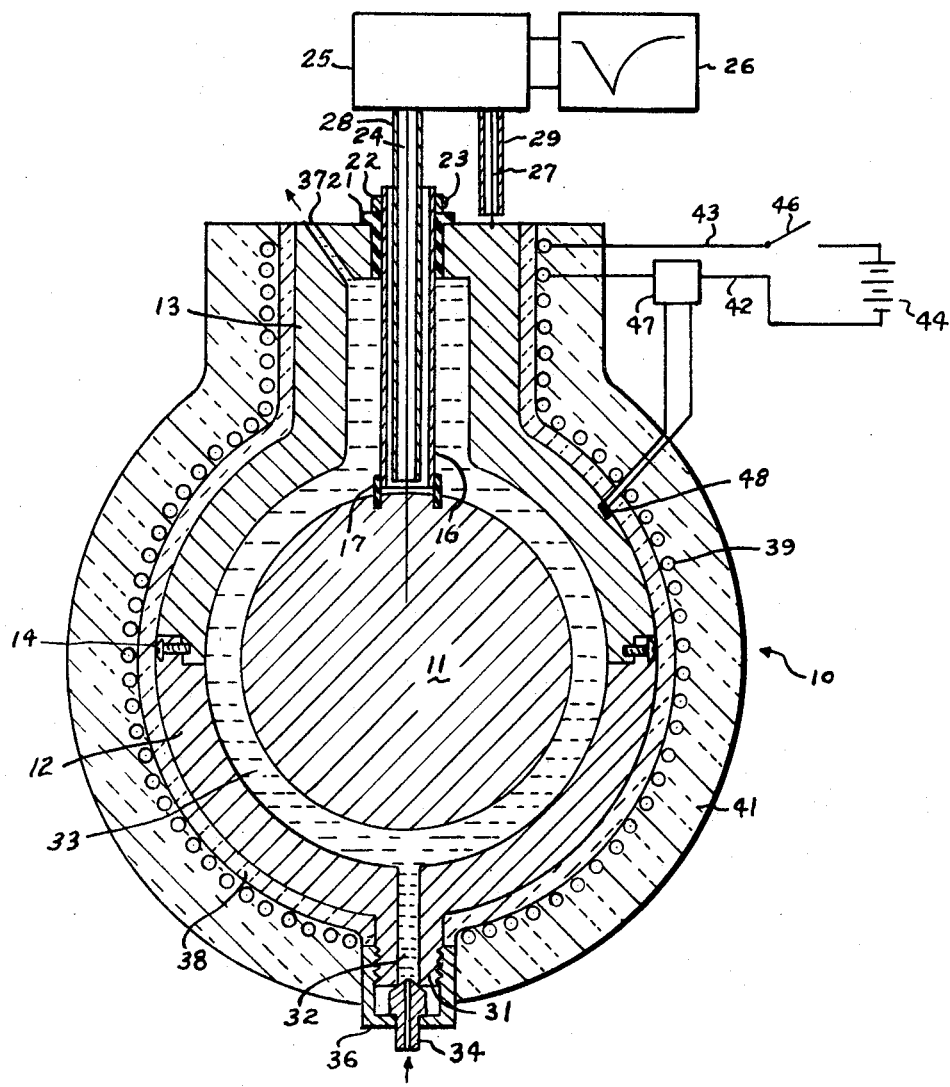
FIG. 1 is a front elevational view, partly in cross section, illustrating a preferred embodiment of the apparatus of this invention.

Broadly speaking, the method of this invention comprises the steps of filling with a fluid the space between two spaced apart, concentric, geometrically similar objects which are in a state of thermal equilibrium, changing the temperature of the outer of the two concentric bodies; measuring the capacitance between the bodies as the temperature of the outer body changes; and measuring the time required for the capacitance measurement to reach a constant value, thereby indicating that the two bodies are in a new state of thermal equilibrium. From a knowledge of the geometry of the bodies and the heat input rate and from information obtainable from the capacitance-time curve, the thermal conductivity, the thermal diffusivity and dielectric constant of the fluid can be computed.

In another embodiment, the invention resides in an apparatus comprising an inner and an outer body, the bodies being geometrically similar, concentrically positioned, and spaced apart from one another; means for centering the inner body within the outer body; means for introducing fluid between the bodies; means for withdrawing fluid from between the bodies; heat exchange means associated with the outer body; means for measuring capacitance; and a pair of electrical leads connecting the inner and outer bodies to the capacitance measuring means.

Reference is now made to the drawing in which identical reference numerals have been used to designate similar elements.

In FIG. 1 the apparatus or instrument 10 of this invention comprises an inner body 11 and an outer body 12. The inner and outer bodies are geometrically similar, concentrically positioned, and spaced a uniform distance apart. As illustrated, the inner body is a solid metal sphere whereas the outer body is in the form of a spherical metal shell. Except for the opening in its cylindrical throat section 13, the spherical shell of the outer body completely surrounds the inner body. While the inner body is shown as being a solid sphere, it can also be in the form of a spherical shell. It is preferred that the inner and outer bodies be spherical in shape, but it is within the contemplation of the invention to use other geometrically similar bodies, such as cylinders.

To permit assembly of the bodies, the outer body is fabricated in two sections having grooves cut in their opposing edges. After placement of the two sections around the inner body, they are fixedly attached to one another along their grooved edges by means of bolts 14 which pass through the side of the lower section groove and are threaded into the side of the upper section groove. The inner body is concentrically positioned within the outer body by means of centering rod 16 which is in the form of a hollow metal tube. The lower end of the centering rod is attached to the inner body by means of any suitable insulator 17. As illustrated, the insulator is cylindrical in shape having it upper end attached to the rod by any suitable means, e.g., by an adhesive. The lower end of insulator 17 is attached to body 11 by being positioned in a circular groove formed in the top of body 11. The insulator can be secured in the groove by means of an adhesive. The rod is so attached to the insulator that its lower end does not contact the inner body. The centering rod, which extends through and above the opening in throat section 13, is insulated from the throat section of the outer body by insulator 21. This insulator is shown as being cylindrical in form with an upper flange which rests on the upper surface of the throat section. Insulator 17 can be fabricated from any suitable insulating material but it is usually preferred to utilize an alumina insulator. Also, insulator 21 can likewise be formed of any suitable insulating material, such as a ceramic material, a Bakelite phenol-formaldehyde resin and the like. It is to be understood that the centering rod can also be formed of a plastic material, such as a Bakelite resin, which may be connected directly to body 11. When using a plastic centering rod, insulator 21 may be omitted.

Positioned around the centering rod, above and in contact with insulator 21, is a lock ring 22 having a set screw 23 which extends through the ring into contact with the centering rod. The lock ring with its set screw makes it possible to adjust the vertical position of the centering rod so that the inner and outer bodies are concentrically disposed.

Electrical lead 24 connects the inner body to the high side of capacitance bridge 25, the output of which is fed to recorder 26. Capacitance bridges with associated recorders for measuring and recording capacitance are commercially available. For example, General Radio Company, West Concord, Massachusetts, offers suitable equipment designated as Type 1680 or 1682. Electrical lead 27 connects the outer body to the low side of the capacitance bridge. Lead 24 is shielded by metal tube 28 which extends into centering rod 16, terminating a short distance above the top of body 11. Lead 27 is shielded by metal tube 29 which terminates a short distance from the throat of outer body 12.

Extending downwardly from the outer body is a cylindrical projection 31 whose surface is provided with threads. An opening 32 having a circular cross section extends through the projection and the outer body and opens into space 33 between the outer and inner bodies. A nozzle member 34 has a conical shaped end which is seated tightly in position in opening 32 by cap 36 which is threaded onto projection 31. The nozzle can be further connected to a line provided with a valve to provide means for introducing a fluid into space 33. An opening 37 having a circular cross section extends through the top of throat section 13, providing means for withdrawing fluid from space 33. A line, which may contain a pump, can be connected to opening 37 in order to evacuate space 33.

THe outside of the outer body is covered with an insulating material 38. While any suitable insulating material, such as rock wool or fiberglas, can be used, it is often preferred to employ asbestos. The asbestos is conveniently applied as sheets which have been soaked in water so that they will readily conform to the shape of the body and adhere to one another. Thereafter, the outer body covered with the asbestos insulation is heated to remove the water.

A heat exchange means is associated with the outer body to provide for the heating or cooling of the outer body. As illustrated the heat exchange means is a heating coil 39 which is positioned in contact with insulation material 38. As a heating coil it is preferred to use a thin wire coated with alumina and enclosed in stainless steel tubing which is sufficiently flexible to permit winding around insulation material 38. The thin wire can be made of any of the well known electrical resistance alloys, such as chrome-nickel or copper-nickel alloys. It is within the scope of the invention to omit the tubing and position the coated thin wire itself next to the insulating material. Furthermore, other types of heat exchange means, e.g., metal tubing through which a heat exchange medium at a desired temperature is circulated, can be employed without departing from the spirit and scope of the invention.

To prevent heat losses, an outer layer of insulating material 41 covers heating coil 39. This layer of insulation can be of the types previously mentioned, but it is usually preferred to use polystyrene or polyurethane foam which can be foamed in place by conventional techniques.

A source of constant power is connected to heating coil 39 by electrical leads 42 and 43. As illustrated, the source of power is a battery 44, but it is to be understood that other power sources, e.g., a generator, can be employed that are adapted to provide a constant power supply. Positioned in lead 43 is a switch 46 which provides means for terminating the flow of current to the heating coil. A temperature control means 47, operatively connected to lead 42 and provided with a thermistor 48, furnishes means for maintaining outer body 12 at a desired constant temperature. As illustrated, thermistor 48 is embedded in outer body 12.

Figure 2:
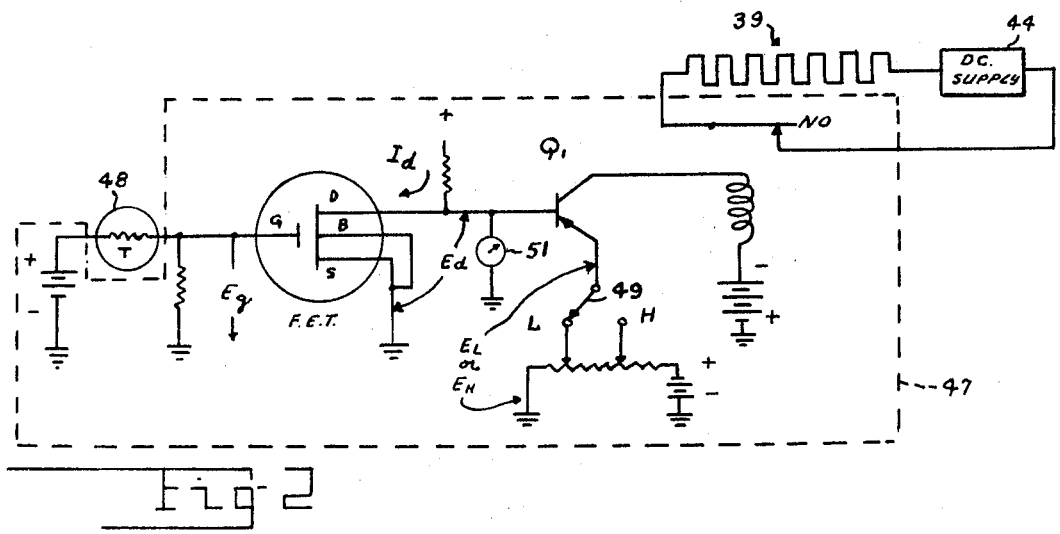
FIG. 2 is a circuit diagram of a means for controlling the temperature of the outer body.

In FIG. 2 a circuit diagram is shown of a temperature controller that is adapted to maintain outer body 12 at a desired constant temperature. As indicated by the position of switch 49 at contact L, it is desired to maintain the outer body at a constant lower temperature L. When the temperature of the body is below the lower temperature L, voltage $E_a$ is relatively high, current $I_d$ is relatively high, voltage $E_d$ is less than voltage $E_L$, and transistor $Q_1$ is conductive, energizing the relay and closing the normally open contacts in the heater element circuit. As the body temperature rises, $E_a$ decreases, thereby causing $I_d$ to decrease and $E_d$ to increase. When the body temperature has reached temperature L, $E_d$ equals $E_L$ and transistor conduction ceases opening the heater circuit. The body then starts to cool, which results in a decrease in voltage $E_d$ below voltage $E_L$, causing the relay contacts to again close. Thus, the relay contact open and close so as to automatically hold the average temperature of the body at L.

In order to increase the body temperature to the higher value H, switch 49 is moved to the H contact. Voltage $E_H$ now being higher than voltage $E_d$, the transistor conducts and the relay contacts close. As a result, the body temperature rises, causing $E_d$ to approach $E_H$. When $E_d$ equals $E_H$ the relay is deenergized causing the relay contacts to open. Thereafter, the contacts open and close as described above to hold the body temperature at an average value of H. It is noted that a potentiometer is provided so that the low and high temperatures can be varied. Also, a voltmeter 51, calibrated in degrees, makes it possible to know the temperature of the outer body at all times. A particular temperature can be readily obtained by changing the position of the contacts on the potentiometer.

In the operation of the apparatus of FIG. 1 of this invention, it is important that heating (or cooling) of the outer and inner bodies be achieved with uniform heat distribution. This is accomplished when the Biot number of a body is of a low value, i.e., less than 0.1. The Biot number is defined as the ratio of thermal resistance for conduction to the thermal resistance for convection. When good conducting materials, such as silver or copper, are used, thermal resistance is low so that a small resistance for convection, i.e., relatively high heat transfer coefficients, can be tolerated without introducing temperature non-uniformity into the body being heated or cooled.

Inner body 11 is heated during operation by means of heat transfer through the surrounding fluid. The amount of heat transferred can be large or small. In order to ensure that the Biot number is small under all conditions, it is necessary that the inner body have a proper wall thickness. With good conducting materials, the inner body can be a solid sphere as illustrated. However, with poor conducting materials, such as a nimonic alloy, the inner body must be hollow sphere having a wall thickness such that the Biot number remains small for the highest heat transfer to be experienced during tests.

As shown in FIG. 1, heating of the outer body is accomplished by means of an electrical heating coil. If the coil were to be positioned in direct contact with the surface of the outer body, uneven temperature distribution would be introduced at the surface. This would in turn result in temperature non-uniformity in the wall of the outer body during heating. In order to avoid this unsatisfactory condition, a heat transfer resistance in the nature of insulation is placed between the heating coil and the surface of the outer body. The thickness of the insulation is chosen so as to obtain small Biot values. Also, the thickness of the insulation is a function of the wall thickness of the outer body and the thermal conductivity of the material of the outer body. For good conducting materials, such as silver and copper, large wall thicknesses with a thin layer of insulation can be selected. However, with an outer body formed of a poor conducting material, the wall thickness must be small while the insulation must be relatively thick. It is generally preferred to utilize a good conducting material to fabricate the inner and outer bodies. However, when tests are conducted under high pressure, the wall thickness of the outer body and the material used must first be chosen with respect to strength. The insulation between the surface of the outer body and the heating coil is then selected to achieve a low Biot number.

The present invention resides in the discovery that the capacitance-time curve obtained when operating the apparatus of FIG. 1 depends upon three different properties, namely, thermal conductivity, thermal diffusivity and dielectric constant, of the fluid filling space 33 between inner boy 11 and outer body 12. Initially in operating the apparatus, space 33 is filled with the fluid to be tested. The outer body is then heated so that it is at a predetermined constant temperature. This is readily accomplished by moving switch 49 of temperature controller 47 to the L contact as shown in FIG. 2. During the heating, capacitance bridge 25 measures the capacitance between the inner and outer bodies, which is recorded graphically on recorder 26. Initially the capacitance values decrease because of the expansion of the outer body. However, as heat is transferred to the inner body causing its expansion, the capacitance values increase. When the value of capacitance remains constant, the inner and outer bodies are in a state of thermal equilibrium at the predetermined temperature L.

Now with the outer and inner bodies at thermal equilibrium at the predetermined temperature L, the outer body is heated to a higher predetermined temperature H. In making this change, switch 49 of the temperature controller is moved to the H contact. As described above, the capacitance bridge measures the capacitance between the outer and inner bodies as heat is transferred between the bodies and the capacitance is graphically recorded. When the value of capacitance remains constant, the inner and outer bodies are in a state of thermal equilibrium at the higher predetermined temperature H.

Figure 3:
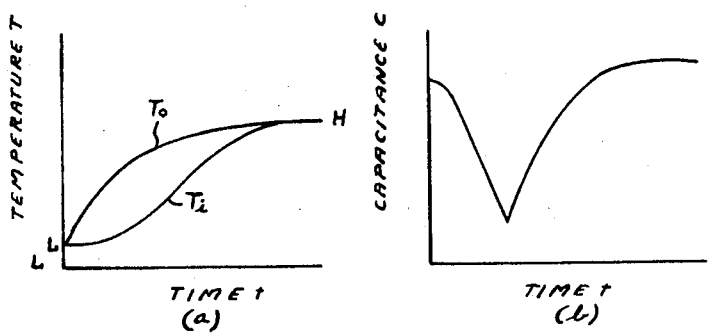
FIG. 3 depicts graphs showing schematically the relationships between temperature and time and between capacitance and time.

Referring now to FIG. 3, the relationships between temperature and time and between capacitance and time are represented schematically for the condition described above where the inner and outer bodies are initially at thermal equilibrium at temperature L and the outer body is heated to a higher temperature H. As seen from graph (a), the two bodies are initially at temperature L. As heating of the outer body commences, its temperature $T_o$ rises rapidly whereas the temperature $T_i$ of the inner body remains unchanged, indicating no transfer of heat through the fluid. The temperature difference between the bodies reaches a maximum and then decrease to zero as heat is transferred from the outer body through the fluid to the inner body. The temperature difference between the two bodies is smallest for highest heat transfer and largest under lowest heat transfer conditions. The change in capacitance between the inner and outer bodies is shown by graph (b). Initially, when the temperature of the outer body is raised, the capacitance decreases. As heat is transferred through the fluid from the outer to the inner body, the capacitance increases until such time as the bodies reach a new state of equilibrium. At this time the capacitance remains constant.

As discussed hereinbefore, in carrying out the method of this invention, the system shown in FIG. 1 is initially at thermal equilibrium. At time zero the outer body is heated by a constant heat input, causing the system to increase in temperature. The heat input is maintained for a long enough period of time to raise the temperature of the outer body to a new higher level which is then maintained. As described above, the change of temperature of the outer body will cause heat to be transferred through the fluid, thereby causing the temperature of the inner body, completely surrounded by the fluid, to rise. The temperature distribution within the fluid can be described by a solution of Fourier's equation. The boundary conditions are constant heat input at the outer body and heat removal into the inner body (increase of its heat capacity).

With the aforementioned boundary conditions and the initial conditions for the system of given geometry and properties, the temperature distribution will be given in a series solution and will be of the form:

$$T(r,t) = f(k, A, \text{geometry}, q),$$

where
 $T$ = temperature of fluid
 $r$ = the distance from the center of the inner body to any location within the fluid,
 $t$ = time,
 $k$ = thermal conductivity,
 $A$ = thermal diffusivity, and
 $q$ = constant heat input rate.

The forgoing equation gives the temperature of the fluid at any time during the heating period and at any location of $r$, including the temperature at the surface of the bodies wetted by the fluid. Thus, the temperature of the fluid at $r_i$ (the distance from center of the inner body to its surface) must equal the fluid temperature at $r_i$. Furthermore, the temperature of the fluid at $r_o$ (the distance from the center of the inner body to the inner surface of the outer body) must equal the surface temperature at $r_o$ of the outer body. The surface temperatures of these two bodies will determine their dimensions at these temperatures. The difference in these dimensions and the change of difference of dimensions with time can be observed very sensitively by the capacitance measurements.

The solution of $T(r,t)$ of the above formula at $r_o$ and $r_i$ can be expressed as capacitance at a given time. A capacitance-time curve provides means to evaluate $k$ and $A$ by the following procedure. The curve gives a capacitance (C) value at a chosen time. The C value can be computed from the $T(r,t)$ solution for $r_o$ and $r_i$ at this time and the capacitance-temperature relationship. A computer will select a certain value of $k$ to produce a value of $A$ which yields the capacitance value measured. The computation requires an iteration procedure. Another C value of the curve can be selected at another time. The previously determined values of $k$ and $A$ should also reproduce the new value of C. In the event that there is a small deviation, the iteration procedure can be repeated until a desired precision in the data is obtained.

Figure 4:
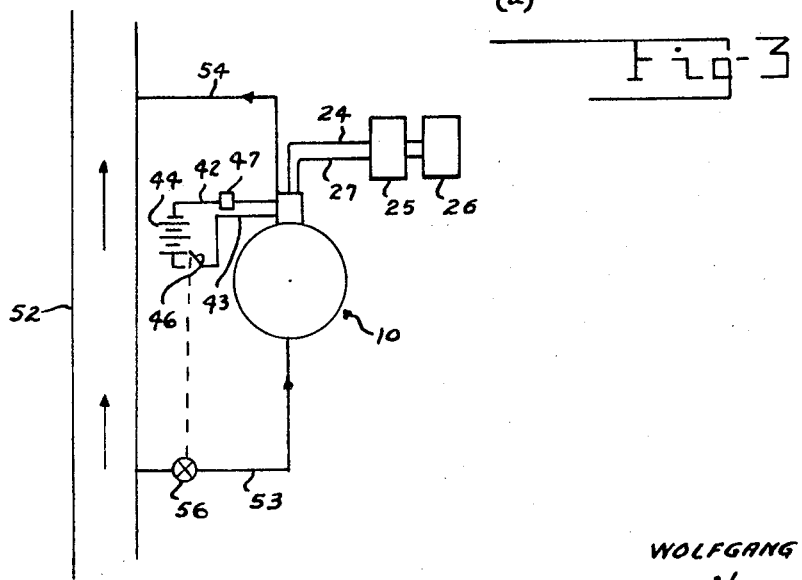
FIG. 4 is a flow diagram showing an arrangement of apparatus employed in product quality control.

Referring now to FIG. 4, a flow diagram is shown in which the apparatus of this invention is used to control the quality of a product produced by a continuous process. Conduit 52 has its upstream end connected to a reactor, distillation column, filter or other source of the product whose quality is to be controlled. The downstream end of the conduit may be connected, for example, to a storage tank or, if an intermediate product, to a reactor for reaction with another material or materials. Line 53 connected to conduit 52 and to the inlet to space 33 between the inner and outer bodies and line 54 connected to conduit 52 and to the outlet from space 33 (see FIG. 1) provides means for circulating the product to be tested through space 33. A valve 56 is positioned in line 53 and is operatively connected to switch 46 in electrical lead 43 connecting battery 44 to the heating coil. When switch 46 is closed to supply current to heat the heating coil, valve 56 is automatically closed in order to assure that the test sample is at rest during the capacitance measurements.

Initially, a product of desired quality is circulated through the instrument, thereby filling space 33. Assuming that the inner and outer bodies are at thermal equilibrium at a known initial temperature, temperature controller 47 is set so that the outer body will be heated to a predetermined higher temperature. Switch 46 is then closed, thereby automatically closing valve 56 in line 53. As a result of the closing of switch 46, current is supplied to the heating coil, and the temperature controller maintains the outer body at the predetermined higher temperature.

During the heating procedure, capacitance bridge 25 measures the capacitance between the inner and outer bodies. When the two bodies are in a new state of thermal equilibrium, the value of capacitance is constant. The output from the capacitance bridge is fed to recorder where the change in capacitance with time is shown as a curve on an oscilloscope. This curve can then be traced on the face of the oscilloscope to give a permanent record of the shape the capacitance-time curve should have when a product of desired quality is being produced.

The foregoing procedure can be repeated periodically to ensure that the desired product quality is being maintained. If the capacitance-time curve deviates from that traced on the oscilloscope, it is an indication that a product of desired quality is not being obtained and that some adjustment or change, e.g., in process conditions, may be necessary.

In the above discussion, it is assumed that the inner and outer bodies are initially at thermal equilibrium at the same temperature and that the outer body is heated to the same predetermined higher temperature. When performing an actual test, it may be necessary to establish an initial state of thermal equilibrium between the bodies at a temperature somewhat higher than the fluid temperature. Then the temperature is raised to a still higher temperature, and a new state of thermal equilibrium is established. This procedure is followed in obtaining the capacitance-time curve for the product having the desired quality and in periodic tests to determine if product quality is being maintained. It is to be understood that the temperatures to which the outer body is heated must be the same in each test.

The apparatus of this invention can also be used for testing the atmosphere of other planets. The apparatus would be carried on a satellite with the openings into the space between the outer and inner bodies remaining open. As the satellite travels through outer space, the space between the bodies is evacuated. However, as soon as the vehicle enters the atmosphere of a planet, the space is charged with the test fluid, i.e., the atmosphere. The system being programmed to undergo a controlled temperature change will produce a capacitance-time curve. This curve can be reproduced on earth but only with a fluid of identical properties. The shape of the curve and the absolute capacitance will permit a determination of dielectric constant of the atmosphere and the magnitude of heat transfer to be made. From this information the composition of the unknown atmosphere can be concluded by an iteration procedure.

The apparatus of this invention can be utilized in many other applications. For example, it can be used in the study of conditions and properties in oceanographic research. Also, it is applicable to any kind of research involving the heat transfer and properties of temperature sensitive material and materials of short life, such as radioactive materials, metastable materials, ionizing materials and chemically reacting materials.

A better understanding of the invention may be obtained by referring to the following example which is not intended to be unduly limitative of the invention.

EXAMPLE

A series of runs was conducted with an apparatus having an outer body or shell which was cylindrical in shape with hemispherical ends. The inner body was a solid of similar geometry. Both bodies were made of a high nickel chromium alloy (Nimonic 80A) which has a low thermal conductivity. However, the change of temperature of the system was established by circulating through covered grooves in the surface of the outer body a transformer oil of such poor heat transfer characteristics that the Biot number was of a very low value. Accordingly, the temperature within the outer body was uniform at any instant of time. The temperature of the transformer oil was controlled by means of a thermostat, and the temperature of the outer body in each run was changed from 24° C. to a new steady value of 38° C. under identical heating rates. The inner and outer bodies were connected to a capacitance bridge.

Tests were run with helium, nitrogen, argon and under a vacuum. In the latter case heat transfer occurs mainly by radiation and along the centering rod. The measured values of capacitance as function of time were plotted and the curves obtained are shown in FIG. 5. From these curves it can be seen that the capacitance changes and the time for a new state of thermal equilibrium to be established vary for the different fluids. For example, the maximum change in capacitance for helium is approximately one order of magnitude less than that of the vacuum and new steady state conditions are established about five times faster.

The capacitance values for each gas at the steady state conditions divided by the respective vacuum values give the dielectric constants. This relationship can be readily proved by the following series of equations.

$$C = E_v \cdot E_g \cdot B, \quad (1)$$

where
$C$ = capacitance of gas at the steady state condition
$E_v$ = the absolute permittivity of a vacuum
$E_g$ = the dielectric constant of the gas
$B$ = a geometric constant $$C_o = E_v \cdot B, \quad (2)$$

where
$C_o$ = capacitance of vacuum at the steady state condition $$(C/C_o) = (E_v \cdot E_g \cdot B / E_v \cdot B) = E_g \quad (3)$$

Equation (3) is obtained by dividing Equation (1) by Equation (2). Thus, it is seen that the dielectric constant ($E_g$) for a fluid can be obtained by dividing the capacitance values as indicated above. The dielectric constant value obtained is the value for the particular temperature at which the steady state conditions prevailed.

As will be evident to those skilled in the art, various modifications of this invention can be made or followed in the light of the foregoing disclosure without departing from the spirit or scope of the invention.

I claim:

1. A method for determining the heat transfer properties of a fluid which comprises the steps of filling the space between an outer conductive body and an inner conductive body, which are geometrically similar and concentrically positioned, with the fluid to be tested, said bodies being initially maintained in a state of thermal equilibrium at a constant predetermined temperature; changing the temperature of said outer body by a constant transfer of heat to a new constant predetermined temperature; maintaining said outer body at said new temperature; measuring the capacitance between said bodies as a function of time as the temperature of said outer body changes and while maintaining said outer body at said new temperature; and measuring the time required for the capacitance measurement to reach a constant value, thereby indicating that said inner and outer bodies are in a new state of thermal equilibrium at said new constant predetermined temperature.

2. A method according to claim 1 in which the temperature of said outer body is changed by heating said body at a constant heat input to said new constant predetermined temperature and the heating is thereafter controlled so as to maintain said body at said new temperature.

3. A method for use in controlling the quality of a fluid product which comprises the steps of filling the space between an outer conductive body and an inner conductive body, which are geometrically similar and concentrically positioned, with a fluid product of desired quality, said bodies being initially maintained in a state of thermal equilibrium at a predetermined initial temperature at least as high as the temperature of said product; heating said outer body at a constant heat input to a new predetermined higher temperature; controlling the heating of said outer body so as to maintain said body at said new temperature; measuring the capacitance between said bodies as a function of time as the temperature of said outer body changes and while maintaining said outer body at said new temperature; continuing to measure the capacitance between said bodies until said capacitance measurement remains constant, thereby indicating that said inner and outer bodies are in a new state of thermal equilibrium at said new predetermined higher temperature; withdrawing said fluid product of desired quality from said space; filling said space between said bodies with a fluid of unknown quality, said fluid being a product of the same process as the fluid product of desired quality, said bodies being in a state of thermal equilibrium at said predetermined initial temperature; heating said outer body at a constant heat input to said new predetermined higher temperature; controlling the heating of said outer body so as to maintain said body at said new temperature; measuring the capacitance between said bodies as a function of time as the temperature of said outer body changes and while maintaining said outer body at said new temperature; continuing to measure the capacitance between said bodies until said capacitance measurement remains constant, thereby indicating that said inner and outer bodies are in a new state of thermal equilibrium at said new predetermined higher temperature; and comparing the capacitance measurements obtained with said fluid product of desired quality with the capacitance measurements obtained with said fluid product of unknown quality.

4. An apparatus for determining the heat transfer properties of fluids which comprises an inner conductive body and an outer conductive body, said bodies being geometrically similar and concentrically positioned in spaced-apart relationship with respect to one another so as to provide a space therebetween; means for centering said inner body within said outer body; means for introducing fluid into said space between said bodies; means for withdrawing fluid from said space between said bodies; heat exchange means associated with said outer body for transferring heat by a constant known amount and including means substantially confining the resultant heat flow between said inner and outer bodies; means for controlling the temperature of said outer body including means to maintain said outer body at a predetermined temperature when said temperature is reached as a result of heat transfer; means for continuously measuring capacitance as a function of time; and a pair of electrical leads connecting said inner and outer bodies to said capacitance measuring means.

5. An apparatus according to claim 4 in which said inner body is a solid metallic sphere and said outer body is a metallic, spherical shell.

6. An apparatus according to claim 5 in which said outer body is covered with a first insulating material; said heat exchange means is a heating coil wound around said first insulating material and covered with a second insulating material and having its ends connected to a constant power source; and said constant power source is operatively connected to said means for controlling the temperature of said outer body.

7. An apparatus according to claim 6 in which said capacitance measuring means is a capacitance bridge and said capacitance bridge is connected to a means for recording capacitance measurements as a function of time.

8. An apparatus according to claim 7 in which said constant power source is a battery; a first electrical lead connects the positive terminal of said battery to one end of said heating coil; a second electrical lead connects the negative terminal of said battery to the other end of said heating coil; and a switch is positioned in said first electrical lead.

9 An apparatus according to claim 8 in which said means for controlling the temperature of said outer body is a temperature controller operatively connected to said second electrical lead and to a thermistor embedded in said outer body.

10. An apparatus according to claim 9 in which said means for introducing fluid into said space between said bodies is an inlet line having one of its ends connected to a first opening in said outer body to said space and its other end connected to a fluid product conduct; a valve is positioned in said inlet line, said valve being operatively connected to said switch positioned in said first electrical lead; and said means for withdrawing fluid from said space between said bodies is an outlet line having one of its ends connected to a second opening in said outer body to said space and its other end connected to said fluid product conduit.

* * * * *